(12) United States Patent
Saunders et al.

(10) Patent No.: US 11,834,188 B2
(45) Date of Patent: Dec. 5, 2023

(54) HEALTH BASED ACTUATOR ALLOCATION

(71) Applicant: Kitty Hawk Corporation, Palo Alto, CA (US)

(72) Inventors: Christopher Scott Saunders, San Jose, CA (US); Mark Johnson Cutler, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 17/828,729

(22) Filed: May 31, 2022

(65) Prior Publication Data

US 2022/0289399 A1 Sep. 15, 2022

Related U.S. Application Data

(63) Continuation of application No. 16/698,790, filed on Nov. 27, 2019, now Pat. No. 11,407,521, which is a continuation of application No. 16/133,462, filed on Sep. 17, 2018, now Pat. No. 10,556,704.

(51) Int. Cl.
| | |
|---|---|
| *B64D 31/06* | (2006.01) |
| *B64D 45/00* | (2006.01) |
| *G07C 5/08* | (2006.01) |
| *G05D 1/08* | (2006.01) |
| *G05D 1/10* | (2006.01) |

(52) U.S. Cl.
CPC ............. *B64D 31/06* (2013.01); *B64D 45/00* (2013.01); *G07C 5/0808* (2013.01); *B64D 2045/0085* (2013.01); *G05D 1/0808* (2013.01); *G05D 1/101* (2013.01)

(58) Field of Classification Search
CPC .................. B64D 31/06; B64D 45/00; B64D 2045/0085; B64D 35/00; G07C 5/0808; G05D 1/0808; G05D 1/101; G05D 1/0072; G05D 1/0858; B64C 27/20
See application file for complete search history.

(56) References Cited

U.S. PATENT DOCUMENTS

| | | | |
|---|---|---|---|
| 9,856,016 B2 | 1/2018 | Mueller | |
| 9,908,616 B1* | 3/2018 | Horn | .................. B64C 29/0033 |
| 9,977,432 B1 | 5/2018 | Cutler | |
| 2013/0020429 A1 | 1/2013 | Kroo | |

(Continued)

FOREIGN PATENT DOCUMENTS

| | | |
|---|---|---|
| CN | 106335632 | 1/2017 |
| WO | 2015138217 | 9/2015 |

*Primary Examiner* — Michael V Kerrigan
(74) *Attorney, Agent, or Firm* — Van Pelt, Yi & James LLP

(57) ABSTRACT

Commands, including a first and second command associated with a first and second rotor module, are determined based at least in part on a set of desired forces or moments and a plurality of health metrics, including by determining a plurality of differences between the plurality of health metrics and a threshold and assigning a lower thrust value to the first command based at least in part on the first difference and a higher thrust value to the second command based at least in part on the second difference, where the first difference indicates a higher degree of wear on the first rotor module than the second difference indicates for the second rotor module. The commands are sent to the rotor modules and after the commands are performed, updated health metrics are determined.

18 Claims, 13 Drawing Sheets

(56) References Cited

U.S. PATENT DOCUMENTS

| | | |
|---|---|---|
| 2015/0353192 A1 | 12/2015 | Morrison |
| 2018/0072430 A1 | 3/2018 | Misfeldt |
| 2018/0105279 A1 | 4/2018 | Tighe |
| 2018/0127094 A1 | 5/2018 | Zapata |
| 2018/0157276 A1 | 6/2018 | Fisher |
| 2018/0188723 A1 | 7/2018 | Lee |
| 2019/0236732 A1 | 8/2019 | Speasl |

\* cited by examiner

| Most Important Component | Movement along and Rotation about x-(Roll) Axis and y-(Pitch) Axis | 1050 |
|---|---|---|
| -- | Movement along z-(Yaw) Axis | 1052 |
| Least Important Component | Rotation about z-(Yaw) Axis | 1054 |

HEALTH BASED ACTUATOR ALLOCATION

CROSS REFERENCE TO OTHER APPLICATIONS

This application is a continuation of U.S. patent application Ser. No. 16/698,790 entitled HEALTH BASED ACTUATOR ALLOCATION filed Nov. 27, 2019, which is a continuation of U.S. patent application Ser. No. 16/133,462, now U.S. Pat. No. 10,556,704, entitled HEALTH BASED ACTUATOR ALLOCATION filed Sep. 17, 2018, each of which is incorporated herein by reference for all purposes.

BACKGROUND OF THE INVENTION

New types of aircraft are being developed which take off and land vertically but which are also able to fly forwards (e.g., at a constant altitude) if desired. Improvements to the aircraft which can extend the flight time and/or range of the aircraft would be desirable. Furthermore, it would be desirable if such improvements could be made without adding new components. This enables such improvements to be used with ultralight aircraft (e.g., with very stringent weight requirements and/or which may already be close to their weight limit).

BRIEF DESCRIPTION OF THE DRAWINGS

Various embodiments of the invention are disclosed in the following detailed description and the accompanying drawings.

DETAILED DESCRIPTION

Figure 1:
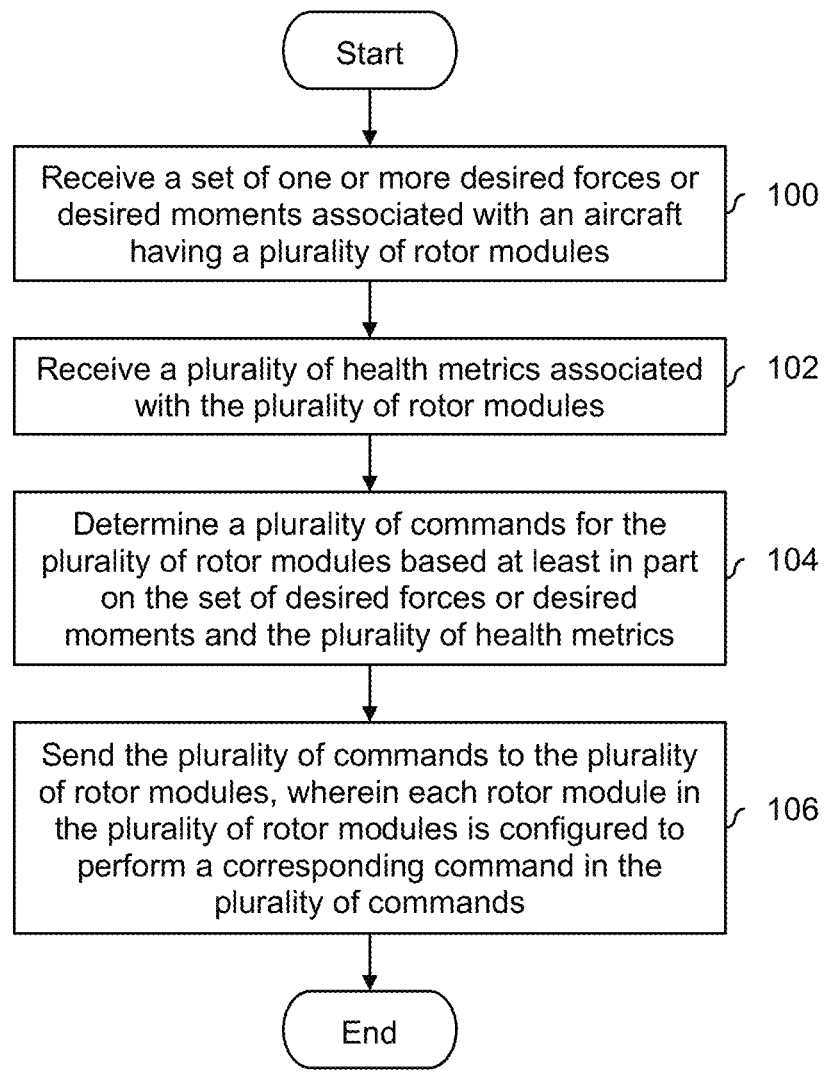
FIG. 1 is a flowchart illustrating an embodiment of a process to determine commands for rotor modules based at least in part on health metrics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to determine commands for rotor modules (e.g., including an amount of thrust for a given rotor module) are described herein. In some embodiments, the technique includes receiving a set of one or more desired forces or desired moments associated with an aircraft having a plurality of rotor modules, receiving a plurality of health metrics associated with the plurality of rotor modules (e.g., the temperature of a battery which supplies power for a given rotor module), determining a plurality of commands for the plurality of rotor modules (e.g., an amount of thrust for a given rotor module) based at least in part on the set of desired forces or desired moments and the plurality of health metrics, and sending the plurality of commands to the plurality of rotor modules, wherein each rotor module in the plurality of rotor modules performs a corresponding command in the plurality of commands.

In some cases, using health metrics to determine commands enables better performance by the aircraft. For example, as will be described in more detail below, the rotor modules (e.g., each of which may include a battery, a motor controller, etc.) may start out at different levels of health and/or have their health degrade due to different levels of use. If the health of any rotor module (or any component therein) gets too bad, the aircraft may be forced to land even though the battery system still has sufficient power to fly some more. This limitation on the flight time and/or range of the aircraft is avoidable. By taking health metrics into account (e.g., by assigning less thrust to unhealthier rotor modules and more thrust to healthier rotor modules), premature landings due to unhealthy rotor modules can be prevented (or at least delayed) so that the flight time and/or range of the aircraft can be extended. Furthermore, in some embodiments, the changes and/or improvements can be made in firmware or other software associated with the flight computer so that no additional (e.g., physical) components are needed. This is attractive for ultralight aircraft which have stringent weight requirements and/or already may be close to their weight limit.

FIG. 1 is a flowchart illustrating an embodiment of a process to determine commands for rotor modules based at least in part on health metrics. In some embodiments, the process is performed by a block or module within a flight computer (e.g., alternatively, a flight controller) in an aircraft, such as an allocation block which inputs desired forces and/or desired moments and outputs commands (e.g., which specify an amount of thrust) for a corresponding rotor module. For example, if the aircraft has 10 rotor modules, then 10 commands would be generated.

At 100, a set of one or more desired forces or desired moments associated with an aircraft having a plurality of rotor modules is received. For example, a flight computer may receive a desired position from a pilot via a joystick or other hand control and/or input device. In one example described below in more detail, block(s) and/or module(s) upstream of the allocation block in the flight computer generate any number of desired forces and/or desired moments (e.g., which would be produced by the yet-to-be-determined commands to the rotor modules and which would result in the desired position specified by the pilot) from the desired position. In an example described below, the set of desired forces or desired moments received at step 100 includes a desired force (e.g., $F_z$ which is along the z axis) and three desired moments (e.g., $M_x$, $M_y$, and $M_z$ which are along the x-axis, y-axis, and z axis, respectively). Any number of desired forces and/or desired moments may be received, including a set of (e.g., all or only) desired forces or a set of (e.g., all or only) desired moments.

At 102, a plurality of health metrics associated with the plurality of rotor modules is received. In some embodiments, each rotor module includes some health monitoring block or module which monitors the health of the rotor module (e.g., overall and/or with respect to specific components within the module, such as a battery-specific health metric, a motor-specific health metric, etc.). In some embodiments, the health monitoring block outputs a health metric signal which is quantitative and within some (e.g., continuous) range. Alternatively, the health metric can be a qualitative and/or discrete value, such as a binary value of "good (health)" or "poor (health)."

In some embodiments, a health metric includes (or is based on) one or more of the following: a temperature (e.g., of the rotor module as a whole or a component within the rotor modules such as a battery, a rotor, a motor controller, etc.), a voltage (e.g., at the rotor module level or component-level), an efficiency (e.g., propulsive, electrical, etc.), an age (e.g., of the rotor module as a whole or a component within the rotor module since the rotor module and/or its components can be swapped out independently and so some rotor modules and/or their components may be newer compared to others), a degree or amount of usage or wear (e.g., record some sampled or measured metric (e.g., an electrical (input) signal and resulting (output) thrust when the component is first installed or otherwise new in order detect wear (e.g., wear in the bearings of the rotors may be detected and/or quantified by a lower output thrust relative to a same amount of input electrical signal)).

At 104, a plurality of commands for the plurality of rotor modules is determined based at least in part on the set of desired forces or desired moments and the plurality of health metrics. In one simple and easy-to-explain example, suppose there is some standard or baseline allocation technique that determines (e.g., standard or baseline) commands based only on the desired forces or desired moments without taking the health metrics into consideration. Conceptually, step 104 uses the health metrics to allocate the commands (e.g., the amount of thrust specified by a given command for a given rotor module) to "ease up" on one or more rotor modules which have poor(er) health (e.g., on a relative or absolute scale) by specifying less thrust for those rotor modules in poor(er) health relative to the standard or baseline commands which did not take the health metrics into account. To compensate for such reduction(s) (e.g., in thrust), commands to one or more of the health(y/ier) rotor modules (e.g., near the rotor modules in poor(er) health) have higher thrust values relative to the standard or baseline commands which did not take the health metrics into account.

At 106, the plurality of commands is sent to the plurality of rotor modules, wherein each rotor module in the plurality of rotor modules is configured to perform a corresponding command in the plurality of commands. For example, if there are 10 rotors there will be 10 commands generated at step 104 and each command will be sent to its respective or corresponding rotor module. The commands may include amounts of thrust and the blades of the rotor module will rotate according to the amount of thrust specified by the command.

In some embodiments, health metrics are used all the time (e.g., even if all of the rotor modules are in a healthy state) to determine commands for the rotor modules (e.g., including amounts of thrust). For example, this may help to maximize the flight time and/or range of the aircraft.

Over the long run, using commands which are determined based on the health metrics degrades the health of the health(y/ier) rotor modules at a faster rate than the health of the rotor modules in poor(er) health so that the health metrics stay at roughly the same level (e.g., instead of having one rotor module degrade precipitously and the other rotor modules be much healthier). In an aircraft application, having one rotor module be in poor(er) health compared to others may result in a rotor-out scenar which could cause the aircraft of land prematurely. Also, a flight computer may be better able to handle a situation where all of the rotor modules have roughly the same level of health, compared to a situation where one of the rotor modules is in poor(er) health compared to the others. For these reasons, using the health metrics to determine the commands to the rotor modules improves the performance of the aircraft or other vehicle.

It may be helpful to describe an exemplary system which performs the process of FIG. 1. The following figures describe an exemplary aircraft and flight computer within such an aircraft which perform the process of FIG. 1.

Figure 2:
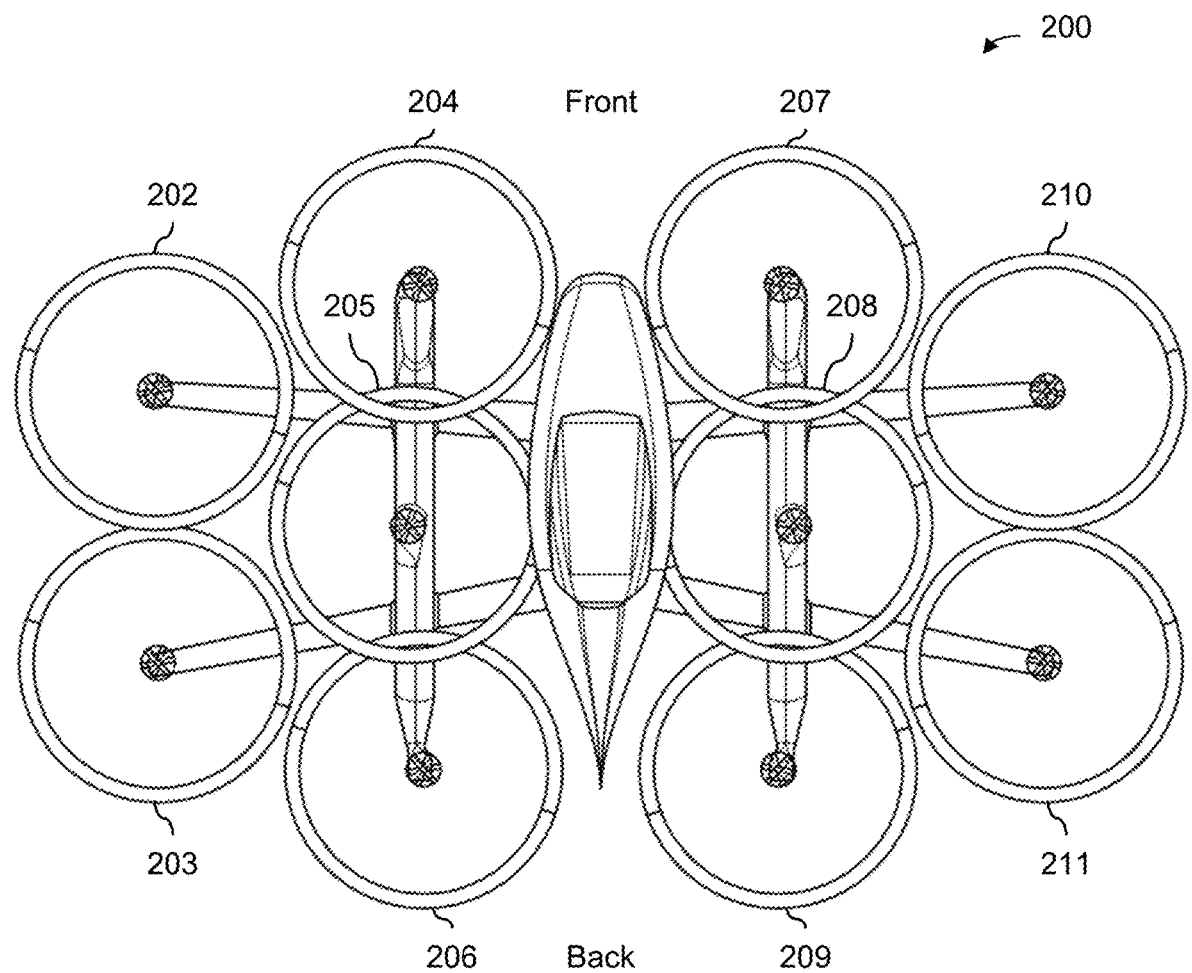
FIG. 2 is a diagram illustrating an embodiment of an aircraft which determines commands for rotor modules based at least in part on health metrics.

FIG. 2 is a diagram illustrating an embodiment of an aircraft which determines commands for rotor modules based at least in part on health metrics. In this example, multicopter 200 shows an example of an aircraft which performs the process of FIG. 1. The exemplary multicopter has 10 rotor modules where the blades of the rotor modules rotate about a substantially vertical axis: left outer front rotor 202, left outer back rotor 203, left inner front rotor 204, left inner middle rotor 205, left inner back rotor 206, right inner front rotor 207, right inner middle rotor 208, right inner back rotor 209, right outer front rotor 210, and right outer back rotor 211. The example aircraft performs vertical takeoffs and landings and is able to hover mid-air, if desired. These modes of flying are sometimes referred to herein as hovering mode. The aircraft can also fly forwards, if desired, at a constant altitude. This is sometimes referred to herein as a forward flight mode.

Prototypes of the exemplary multicopter shown here were developed and flown. In some of the test flights, the multicopter spent much more time hovering mid-air (e.g., as opposed to flying forwards) than was originally anticipated and put more wear or usage than was expected on the front rotors. For context, in the prototype, the center of gravity is slightly forward of center, which is a design target chosen for efficiency in forward flight. The center of gravity doesn't change much in hover position versus forward flight position, but what does shift is the center of pressure (alternatively, the center of lift). In hover, the vehicle has to tilt back by 5 degrees or so to maintain the vertical alignment of the center of pressure with the center of gravity (i.e., and not move forward). This tilt back is enabled by throttling up on the forward rotors in RPM, so that they generate more lift. For short hovering periods, this additional thrust burden on the front rotors is negligible. However, what was observed with the prototype multicopter was that if the multicopter had to hover for a long period of time, the two front rotors (e.g., more specifically, the associated motor controllers) would get too hot, forcing the aircraft to land even though the battery system still had sufficient charge to fly some more. By taking health metrics into account, some of thrust which would otherwise be output by the two inner front rotors (204 and 207) can instead be borne by alternate, neighboring rotors (e.g., 202, 205, 208, and/or 210) so that the two inner and front rotors (204 and 207) rotor modules do not overheat (or, more generally, become too unhealthy). This is one example of how the process of FIG. 1 may be used to extend the flight time and/or range of an aircraft.

The following figures show two examples of flight computers: one where commands destined for the rotor modules are determined without taking health metrics (e.g., associated with those rotor modules) into account and another where the health metrics are taken into account.

Figure 3A:
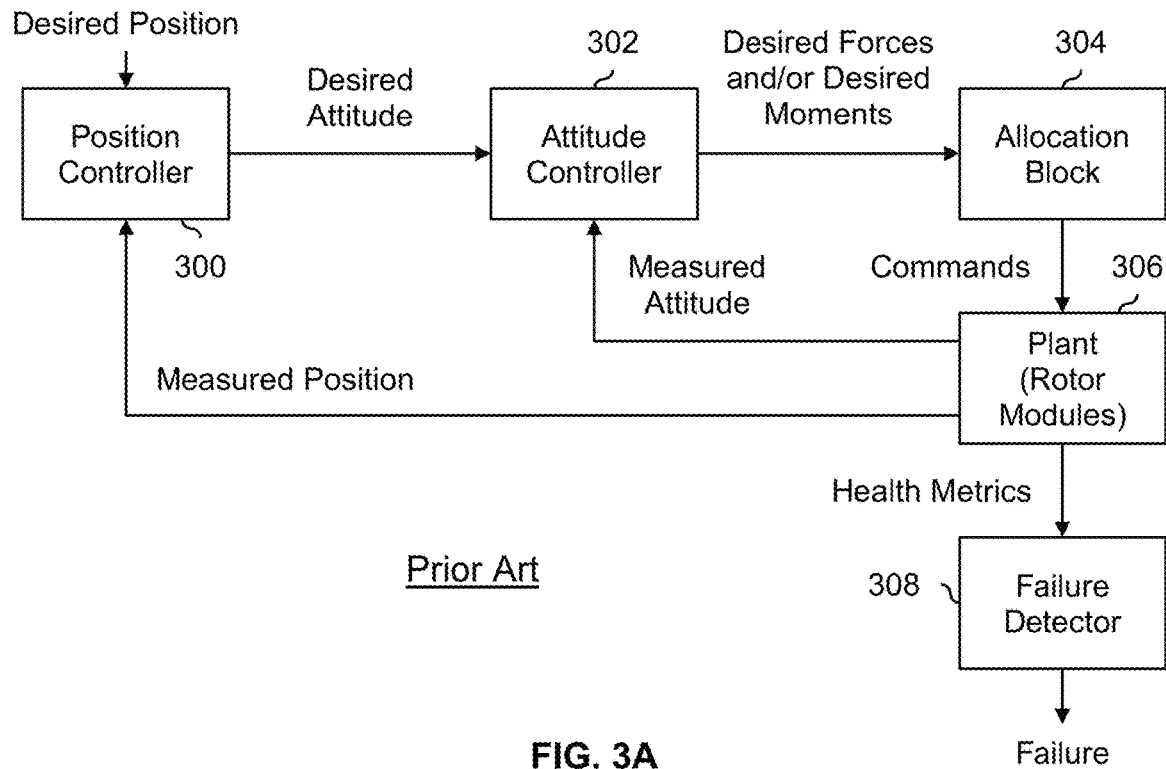
FIG. 3A is a diagram illustrating an example of a system where health metrics associated with the rotor modules are not taken into consideration when determining commands for rotor modules.

FIG. 3A is a diagram illustrating an example of a system where health metrics associated with the rotor modules are not taken into consideration when determining commands for rotor modules. This example shows how some other systems determine commands. A desired position of the aircraft is received, for example from a pilot via a joystick or other input device and/or hand controller. The desired position is passed to a position controller (300) which generates a desired attitude based at least in part on the desired position.

The desired attitude is passed to an attitude controller (302) which generates a set of desired forces and desired moments based on the desired attitude. For example, for the multicopter shown in FIG. 2, there are four forces or moments that are of interest: $F_z$ (i.e., a force on the multicopter along the z (e.g., vertical) axis), $M_x$ (i.e., a moment on the multicopter along the x (e.g., longitudinal) axis), $M_y$ (i.e., a moment on the multicopter along the y (e.g., lateral) axis), and $M_z$ (i.e., a moment on the multicopter along the z (e.g., vertical) axis). More compactly:

$$\vec{FM}_{desired} = \begin{bmatrix} F_z \\ M_x \\ M_y \\ M_z \end{bmatrix}$$

Due to the orientation of the rotor blades in the embodiment of FIG. 2 (where the rotor blades are slightly angled or tilted but (generally speaking) rotate about a substantially vertical axis), the only force of interest is along the z axis. Thrusts along the x-axis and y-axis are not affected by the rotors (e.g., due to the orientation of the rotors) and therefore thrusts along those axes are not of interest to this particular aircraft configuration.

With four desired forces and desired moments and ten rotor modules, there are an infinite number of possible combinations of commands which will produce the desired forces and desired moments. In this example, allocation block 304 will attempt to select commands which maximize battery life and/or flight time.

These commands are passed to the plant (306) which includes the rotor modules. See, for example, the multicopter shown in FIG. 2 which has 10 rotor modules. The rotor modules (e.g., each of which includes a battery, motor, blades, etc.) each perform their respective command, causing changes in the aircraft which are measured by appropriate equipment or sensors so that a measured position and measured attitude are available. The measured position and measured attitude are passed back to the position controller (300) and attitude controller (302), respectively (e.g., so that feedback loops in those blocks can be adjusted as/if needed).

Returning to plant (306), the plant also outputs health metrics but in this example the health metrics are only used to perform failure detection (e.g., to detect if one of the rotor modules or a component therein has failed or is in danger of failing).

However, in the real world, it has been observed that having allocation block 304 not take health metrics into account and/or optimize for maximum battery life or flight time does not always achieve the expected maximum battery life or flight time (e.g., possibly because the rotor modules sometimes operate in unhealthy conditions or states which reduce their performance and/or efficiency so that the calculations made by the allocation block are overly optimistic). In contrast, the block diagram of the flight computer shown in the next figure takes the health metrics of the rotor modules into account when determining commands for the rotor modules (e.g. which may enable the rotor modules to operate in health(y/ier) regimes and have better performance and/or efficiency).

Figure 3B:
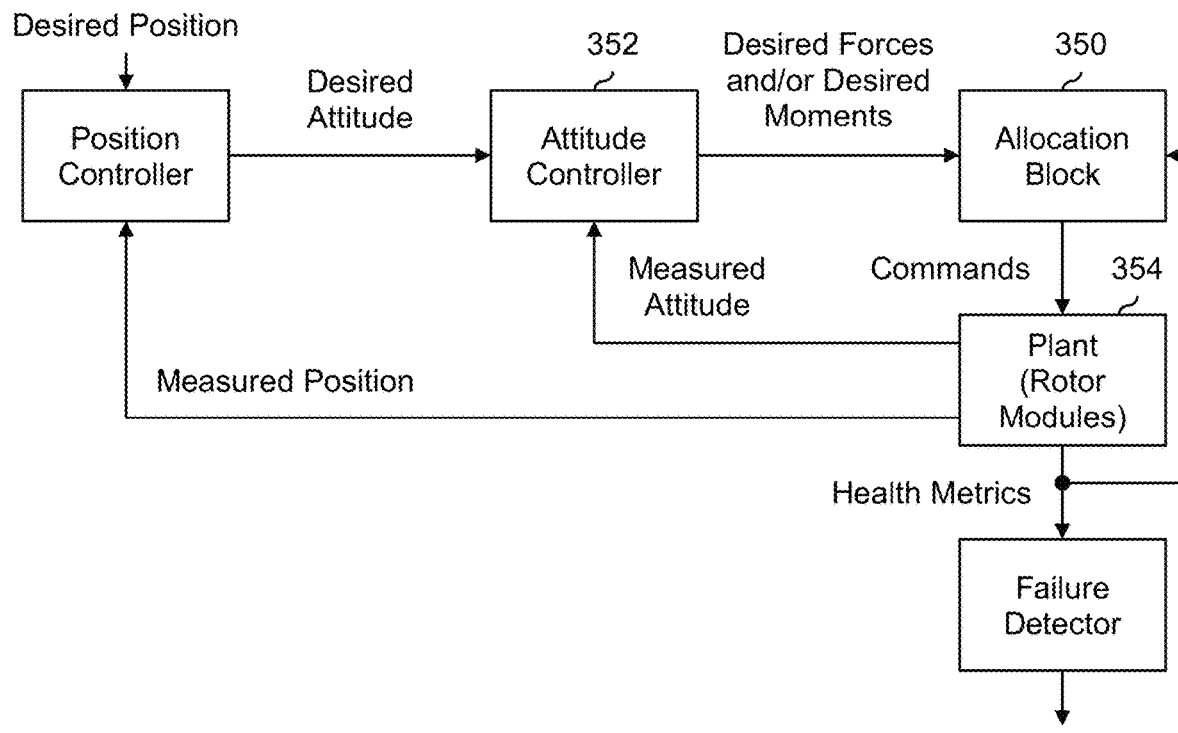
FIG. 3B is a diagram illustrating an example of a system where health metrics associated with the rotor modules are taken into consideration when determining commands for the rotor modules.

FIG. 3B is a diagram illustrating an example of a system where health metrics associated with the rotor modules are taken into consideration when determining commands for the rotor modules. In this example, the block diagram is the same as in FIG. 3A except the allocation block (350) inputs both the desired forces and desired moments from attitude controller 352, as well as the health metrics from plant 354 and uses both to generate the commands which are passed to the plant (354). For example, allocation block (350) will still try to meet the desired forces and desired moments, but in a way that does not (as example) mitigate the impact on unhealthier rotor modules and shifts the health-related cost burden instead to healthier rotor modules which are in a better state of handle it.

For example, suppose that each of the rotor modules in FIG. 2 has a built-in health monitoring circuit which outputs a health metric signal (e.g., some quantity within a continuous range of values). Suppose that right inner front rotor 207 in FIG. 2 has an unhealthier health metric signal whereas the rest of the rotor modules have healthier health metric signals. Generally speaking, the more a rotor module has to work (e.g., measured and/or represented by the amount of thrust in a command), the more the health of that rotor module will degrade (e.g., especially if the rotor module is unhealthier). To prevent the unhealthier rotor module from becoming even more unhealthy, in one example, allocation block 350 decreases an amount of thrust in the command for the unhealthier rotor module (in this example, 207) and increases an amount of thrust in one or more healthier rotors to compensate. For example, since right inner middle rotor (208) and right outer front rotor (210) are the closest to rotor 207, the amounts or levels of thrust in commands to those rotors may be increased to compensate for the reduced thrust associated with rotor 207.

In some embodiments, the health metrics are used by allocation block 350 to allocate thrusts in real time, where the amount of thrust change (e.g., removed from an unhealthier rotor module and/or added to a healthier rotor module) varies in accordance with (e.g., commensurate with) the difference in health metrics between the two. For example, if the unhealthier rotor module and neighboring, healthier rotor module are relatively close in health metrics, the amounts of thrusts may be reduced and increased (respectively) only slightly. However, if one rotor module is very unhealthy compared to another neighboring rotor module, the amount of thrusts may be changed to a much greater degree or amount.

In some embodiments, allocation block (350) weights the needs of satisfying the desired forces and desired moments and health considerations depending upon how critical the health metrics of the rotor modules are. For example, if all of the rotor modules are relatively healthy (e.g., there is still some "wiggle" room and nothing is critical yet), then commands are determined which satisfy the desired forces and desired moments and the health considerations are accommodated as best they can. However, if things become critical (e.g., one or more of the rotor modules have relatively unhealthy or critical stage health metrics), then health considerations are accommodated first at the expense of the desired forces and desired moments. In some embodiments, there are weight metrics or parameters (e.g., a first weight for the desired forces and desired moments and a second weight for health metrics and/or considerations) and the weights are adjusted accordingly.

It is noted that the exemplary multicopter shown in FIG. 2 is very amenable to this technique because the relatively large number of rotors and the placement of the rotors means that there are other rotors available to compensate for the reduced thrust by an unhealthier rotor module. In contrast, suppose that a multicopter only had four rotors arranged in a square pattern. If the thrust from a single (e.g., specific) rotor in a 4-rotor arrangement needed to be reduced because of health, there is a single alternative solution which works. However, if this single solution is not suitable, there are no other alternatives. Very generally, more rotors give more allocation flexibility. This also depends on the positioning of the rotors with respect to the vehicle center of gravity, and the rotor angles. Therefore, the exemplary multicopter with its large number of rotors and distributed placement of rotors offers more possibilities and/or alternatives than a 4-rotor arrangement.

With allocation block 350, it may be possible to avoid a failure scenar which may only be detected in FIG. 3A by failure detector 308 when it is too late to prevent that failure. For example, allocation block 304 in FIG. 3A is unaware of the health of the various rotor modules and may unknowingly send a large thrust command to an unhealthy rotor module for an extended period of time. In other words, allocation block 350 in FIG. 3B takes a proactive approach to failures (i.e., prevent them from occurring in the first place) whereas allocation block 304 in FIG. 3A takes a reactive approach to failures.

Using the health metrics to determine commands may also keep the rotor modules in (e.g., roughly) the same state of health so that one rotor module is not in relatively poor health compared to the other rotor modules. This may be attractive in some applications where the flight computer is better able to handle a scenario where the rotor modules have substantially the same level or degree of healthiness as compared to scenarios where one is in much poorer health compared to the others (e.g., the aircraft needs to maneuver quickly and/or sharply to avoid something). As described above, this may enable all of the rotor modules to operate in healthier states which enables the rotor module to behave closer to some expected model, more efficiently, have better performance, etc.

In some embodiments, the processing associated with allocation block 350 is performed in firmware, software, or other programming instructions. One benefit to this that the aircraft shown in FIG. 3 is an ultralight aircraft with very stringent weight requirements and/or which may already be very close to its weight limit. By making these improvements (e.g., using health metrics to determine commands for the rotor modules) in firmware, software, or other programming instructions, the weight of the aircraft does not increase (e.g., because no new physical parts or components are added) which is desirable for the exemplary ultralight aircraft.

Returning briefly to FIG. 1, allocation block 350 is an example of a block or component which performs the process of FIG. 1. Note, for example, that allocation block 350 inputs a set of one or more desired forces or desired moments (see step 100 in FIG. 1), inputs health metrics (see step 102 in FIG. 1), determines commands based at least in part on desired forces or desired moments and health metrics (see step 104 in FIG. 1), and outputs commands (see step 106 in FIG. 1).

The following figures describe the above examples more generally and/or formally in flowcharts.

Figure 4:
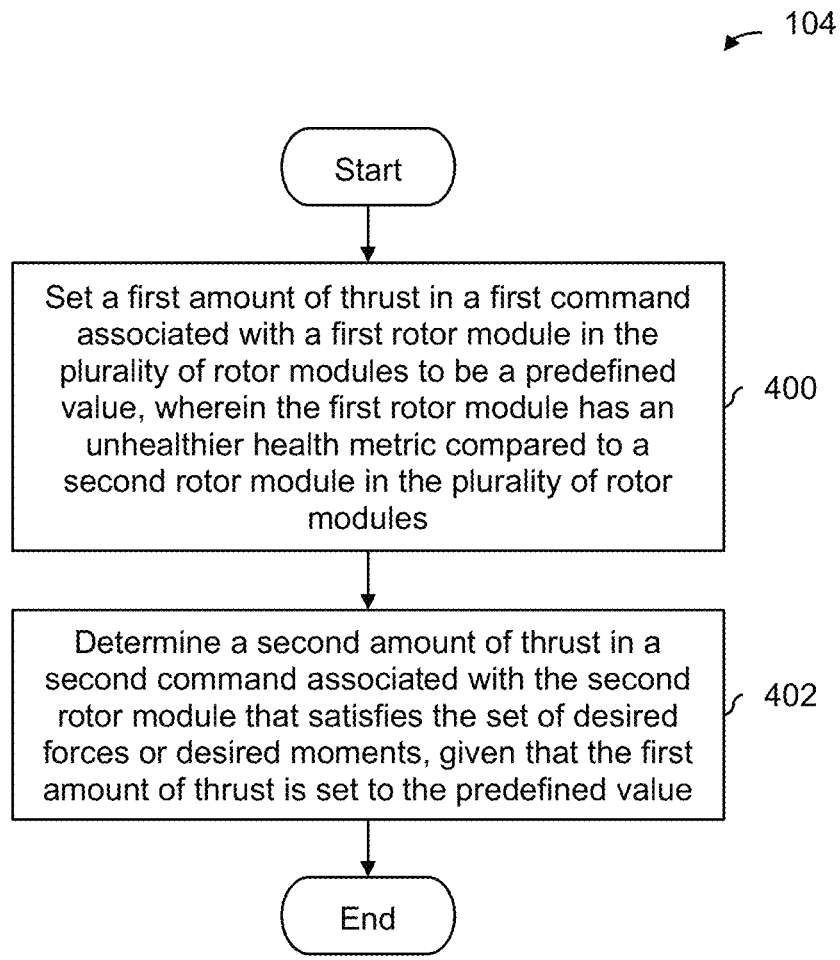
FIG. 4 is a flowchart illustrating an embodiment of a process to determine a plurality of commands, including by using a predefined amount of thrust.

FIG. 4 is a flowchart illustrating an embodiment of a process to determine a plurality of commands, including by using a predefined amount of thrust. In some embodiments, step 104 in FIG. 1 includes the example process shown here. In some embodiments, the process is performed by an allocation block.

At 400, a first amount of thrust in a first command associated with a first rotor module in the plurality of rotor modules is set to be a predefined value, wherein the first rotor module has an unhealthier health metric compared to a second rotor module in the plurality of rotor modules.

For example, suppose that right inner front rotor 207 in FIG. 2 has an unhealthier health metric compared to right outer front rotor 210. It may be undesirable to have any rotor module completely stop rotating, even if that rotor module is unhealthy (e.g., in an absolute sense or relative to other rotor modules). In some embodiments, to minimize further deterioration of the health of the first rotor module, the thrust for that rotor module is set to some predefined value (e.g., which would typically be less than an unconstrained thrust value, for example, determined by (old) allocation block 304 in FIG. 3A).

In this example, a command consists (e.g., entirely) of a thrust level or amount. For example, the rotor modules are connected to the floats and booms of the exemplary multicopter (shown in FIG. 2) at fixed positions or angles (e.g., they do not tilt or rotate). The rotor blades have slightly different angles or positions at which they are attached to the multicopter and the multicopter maneuvers due to the different thrust levels passed to the various rotor modules.

At 402, a second amount of thrust in a second command associated with the second rotor module is determined that satisfies the set of desired forces or desired moments, given that the first amount of thrust is set to the predefined value. For example, if rotor module 207 in FIG. 2 is the only rotor module for which the thrust is set to a predefined value at step 400 (e.g., because it is the only rotor module for which there is some accommodation due to health metrics), then thrusts for the remaining rotor modules may be determined so that they satisfy the set of desired forces or desired moments (e.g., without consideration as to the health metrics since any rotor modules for which there was a health concern have already been taken care of at step 400).

Conceptually, another way of thinking of FIG. 4 is that (old) allocation block 304 in FIG. 3A generates some initial thrust values for all rotor modules (e.g., which satisfy the desired forces and/or desired moments and without taking health metrics into consideration). For unhealthier rotor modules, the initial thrust values are decreased; for healthier rotor modules, the initial thrust values are increased (e.g., all in a manner which still satisfies the desired forces and/or desired moments after all of the adjustments).

In some applications, this approach is attractive because it does not require extensive reworking of an existing allocation block. For example, the health metrics may be examined to determine which rotor modules should have a default amount of thrust assigned to them. Then, the rest of the rotor modules may have their commands and/or thrust values determined by an existing allocation block (e.g., 304 in FIG. 3A) which does not input health metrics.

Alternatively, the amounts of thrusts may be determined simultaneously.

Figure 5:
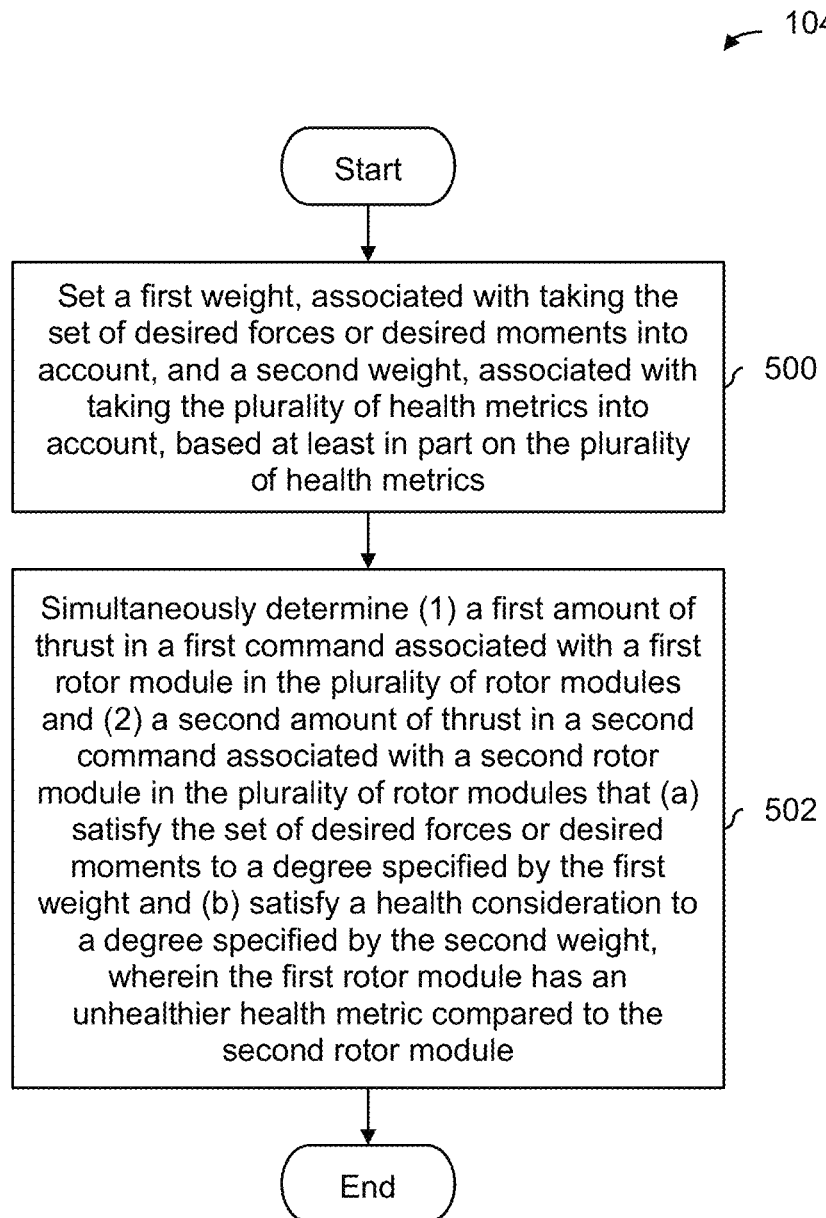
FIG. 5 is a flowchart illustrating an embodiment of a process to determine a plurality of commands, including by using weights.

FIG. 5 is a flowchart illustrating an embodiment of a process to determine a plurality of commands, including by using weights. In some embodiments, step 104 in FIG. 1 includes the example process shown here. In some embodiments, the process is performed by an allocation block.

At 500, a first weight, associated with taking the set of desired forces or desired moments into account, and a second weight, associated with taking the plurality of health metrics into account, are set based at least in part on the plurality of health metrics.

For example, allocation block 350 in FIG. 3B may simultaneously determine thrust values for rotor modules, some of which are unhealthier than others, and the weights enable the allocation block to know to what degree the competing demands of satisfying the desired forces and/or desired moments versus satisfying the health related considerations should be prioritized (e.g., putting more of a burden on healthier rotor modules which are in a better state to accommodate large declines in health).

In one example, if the health metrics are all at relatively the same level and/or all of the health metrics are good (e.g., on an absolute scale), then the weights may be weighted so that less importance is given to shifting the load to healthier rotor modules from unhealthier rotor modules (e.g., the allocation block doesn't worry too much about this aspect) compared to satisfying the desired forces and/or desired moments. For example, in this scenario there may be less of a need to take the health metrics into account when determining the commands (e.g., with all of the health metrics being good on an absolute scale) and/or less of an observed effect by taking the health metrics into account when determining the commands (e.g., because with all of the health metrics being relatively equal there may be relatively little adjustment or shifting of thrusts, etc.).

Alternatively, if (e.g., on an absolute scale) one or more of the rotor modules is unhealthy (e.g., the health metric exceeds some threshold) and/or there is a large disparity in some of the health metrics (e.g., measured by the difference between the minimum and maximum health metrics), then it may be desirable to more strongly take the health metrics into account when determining commands, even at the expense (to some degree) of satisfying the desired forces and/or desired moments.

At 502, (1) a first amount of thrust in a first command associated with a first rotor module in the plurality of rotor modules and (2) a second amount of thrust in a second command associated with a second rotor module in the plurality of rotor modules are simultaneously determined that (a) satisfy the set of desired forces or desired moments to a degree specified by the first weight and (b) satisfy a health consideration to a degree specified by the second weight, wherein the first rotor module has an unhealthier health metric compared to the second rotor module.

For example, in FIG. 3B, in addition to inputting desired forces and/or desired moments and health metrics, allocation block 350 may also be configured to input two weights (not shown) in order to determine the commands (e.g., including a thrust value).

The following figure illustrates an example of components in a rotor module and how measurements associated with those components may be used to generate a health metric.

Figure 6:
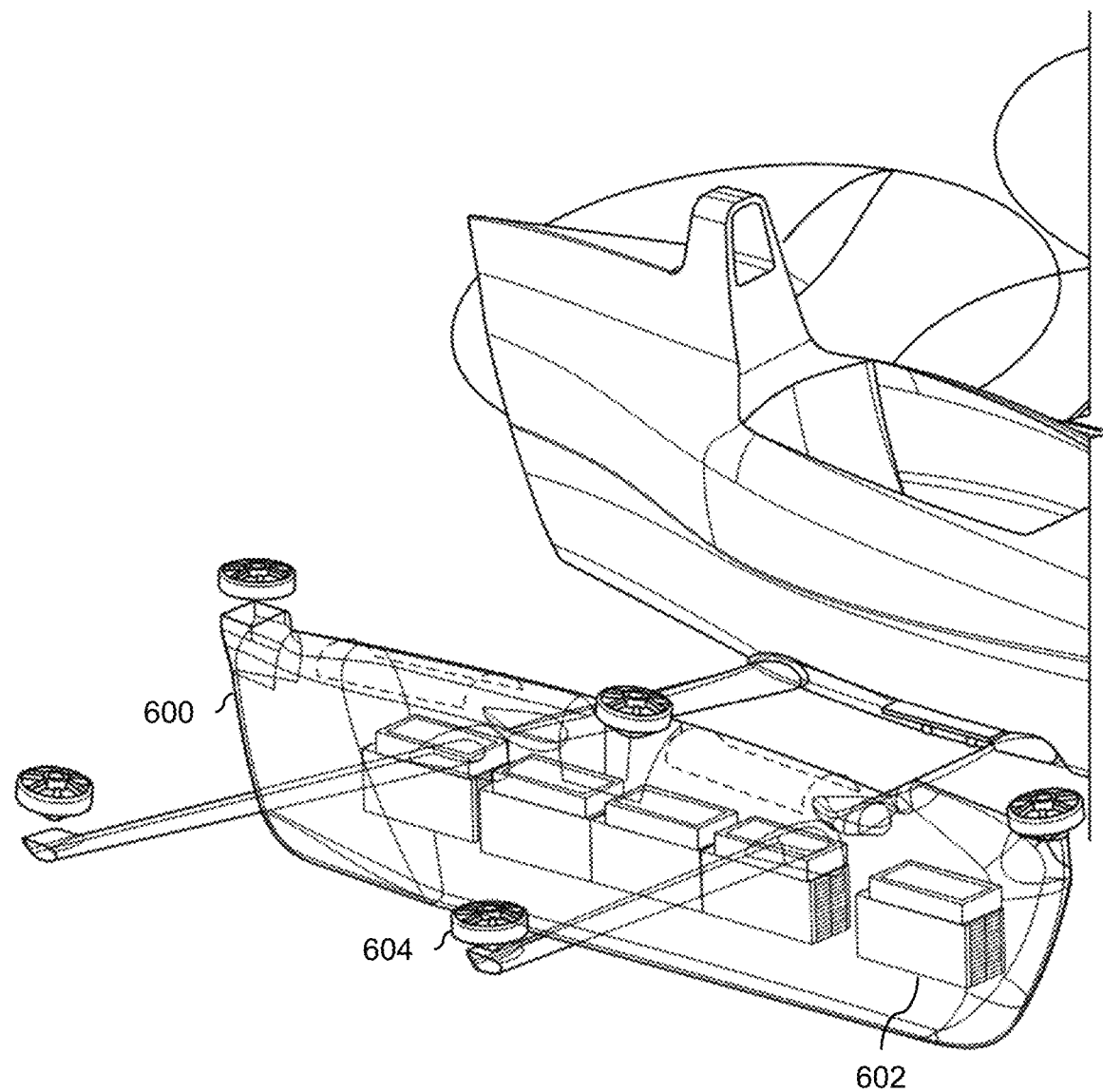
FIG. 6 is a diagram illustrating an embodiment of a multicopter float which includes batteries and motors for each of the rotor modules on that side of the aircraft.

FIG. 6 is a diagram illustrating an embodiment of a multicopter float which includes batteries and motors for each of the rotor modules on that side of the aircraft. In this example, the right float (600) of the multicopter from FIG. 2 is shown. In addition to providing buoyancy when the multicopter is floating on water, the float is used to store the five batteries for the five rotor modules on that side of the multicopter. As shown here, in some embodiments, each rotor module includes its own battery (602). In addition to a battery, each rotor module in this example includes a motor (604). For clarity, the rotor blades are not shown.

In some embodiments, the health metrics (e.g., which are used to generate commands for the rotor modules) include, are based on, or are otherwise associated with temperature of a component in a given rotor module, such as the temperature of a battery (602) in the rotor module and/or the temperature of a motor (604) in the rotor module. A relatively high temperature (e.g., above some threshold) is indicative that the component in question is in poor health and/or that extensive usage of said component (e.g., a large amount of thrust over a long period of time) should be minimized. Generally speaking, a high battery temperature is an indication of an unhealthy battery and a sign that usage of (e.g., power consumption from) that battery should be minimized to the degree possible. In various embodiments, the temperature of the motor controllers, batteries, motors, and/or wiring may be used as and/or contribute to a health metric.

In one example of how a binary "healthy" or "unhealthy" signal may be generated as a health metric for each rotor module, the battery temperature and the motor temperature may be compared against respective thresholds and if at least one component temperature exceeds its corresponding threshold, then the binary signal is set to unhealthy. Otherwise, if both component temperatures are less than their respective thresholds, the binary signal is set to healthy.

As described above, other measurements besides temperature may be used as a health metric and/or be used to generate a health metric including (for example) voltage, efficiency, age, and/or usage. In some embodiments, one of these (other) measurements or quantities is used (e.g., in addition to and/or as an alternative to using temperature when generating the health metric).

In this example, because the floats (600) will come into contact with water, the floats are watertight, which makes dissipation of heat from the batteries (602) more difficult. There is no air vent in the float, for example, which can bring in cooler air from the outside of the float and permit heated air to escape from the inside of the float. The example configuration shown here also does not include fans, heat sinks (e.g., passive devices with large surface areas to dissipate heat, such as fins), or other devices to dissipate heat from the batteries. This is because the exemplary aircraft is an ultralight aircraft with very stringent weight restrictions. This, combined with the watertight nature of the floats, makes such heat transfer devices unattractive in this application. For these reasons, techniques which can (as an example) proactively prevent already-hot batteries from overheating are especially attractive in applications like the one shown here where heat dissipation is impeded.

To put this example in context with FIG. 1, the plurality of rotor modules (e.g., first referred to at step 100) includes a plurality of batteries; the plurality of health metrics (e.g., received at step 102) includes a plurality of battery temperatures associated with the plurality of batteries; and determining the plurality of commands (e.g., step 104) includes determining the plurality of commands for the plurality of rotor modules based at least in part on the set of desired forces or desired moments and the plurality of battery temperatures.

The following figure shows an example of health metrics associated with temperature over a period of time where different predefined thrust levels are used.

Figure 7A:
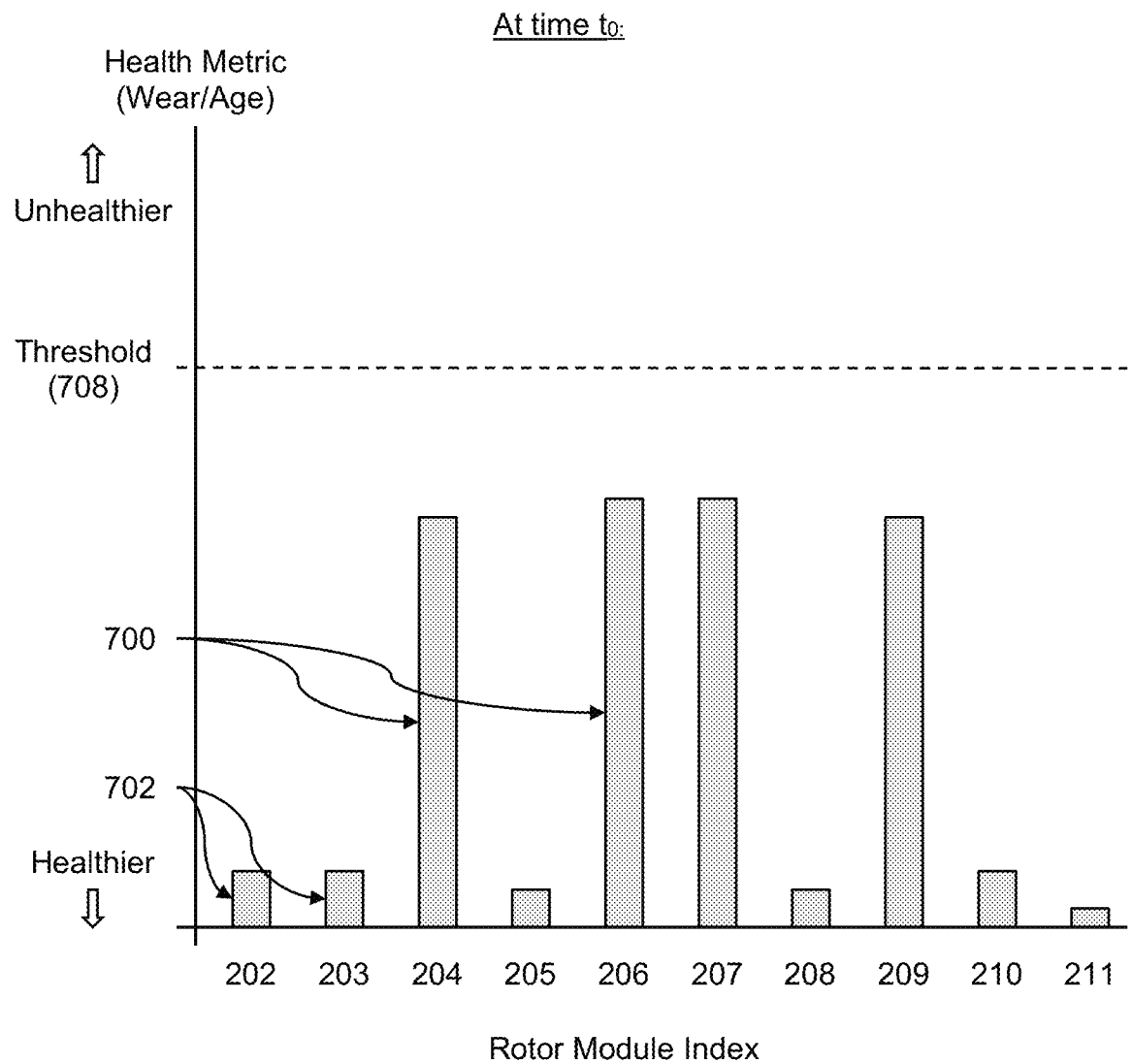
FIG. 7A is a diagram illustrating an embodiment of health metrics associated with wear and/or age at a first point in time where thrust levels are adjusted based on the wear and/or age.

FIG. 7A is a diagram illustrating an embodiment of health metrics associated with wear and/or age at a first point in time where thrust levels are adjusted based on the wear and/or age. In the example shown, the multicopter shown in FIG. 2 has some older rotor modules with more wear and some newer rotor modules with less wear (e.g., bearing wear). More specifically, the two inner front rotors (204 and 207) and the two inner back rotors (206 and 209) in FIG. 2 are more worn and/or aged compared to the other rotor modules. As a result, the (initial) health metrics at time $t_0$ (e.g., when the multicopter is turned on) are higher (i.e., unhealthier) for rotor modules 204, 206, 207, and 209 (see initial health metrics 700) but are lower (i.e., healthier) for rotor modules 202, 203, 205, 208, 210, and 211 (see initial health metrics 702). For convenience and ease of explanation, the rotor module indices shown in FIG. 7 correspond to the rotor modules reference numbers in FIG. 2.

The allocation block takes the health metrics (in this example, associated with temperature) into account and therefore will (e.g., to the degree specified by the weights associated with satisfying the desired forces and/or desired moments versus shifting thrust levels to accommodate health metrics) place more of a burden on healthier rotor modules 202, 203, 205, 208, 210, and 211 to spare unhealthier rotor modules 204, 206, 207, and 209 to some degree. This may be done in a variety of ways (e.g., by using an appropriate predefined thrust value or by setting the allocator weights accordingly). As a result of this, between time $t_0$ and $t_1$, the health metrics and/or temperatures of the less healthy group increase (i.e., get worse) by amounts 704, but not as much as the health metrics and/or temperatures of the healthier group increase (e.g., by amounts 706). The following figure shows the health metrics at that second point in time, $t_1$.

Figure 7B:
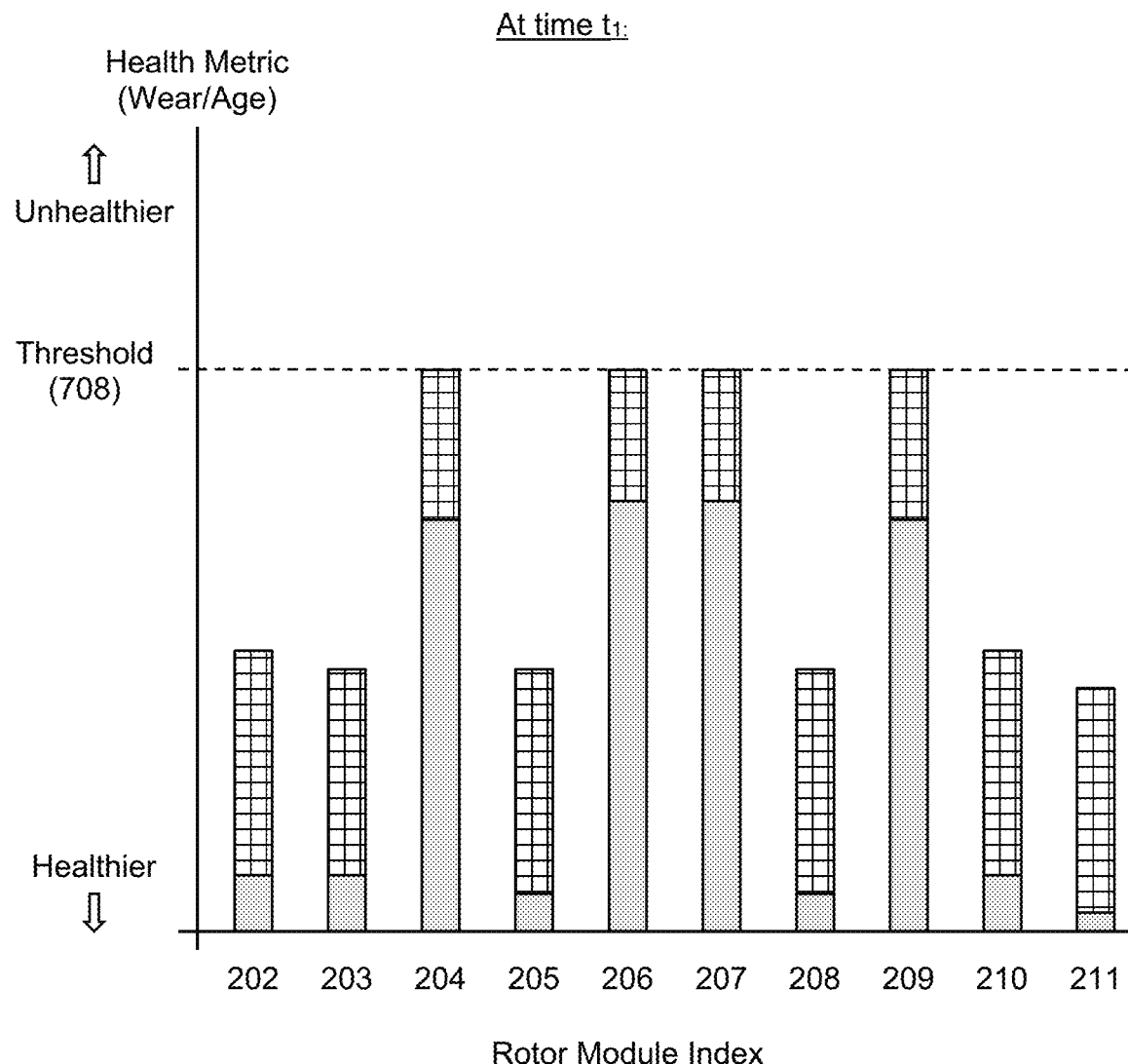
FIG. 7B is a diagram illustrating an embodiment of health metrics associated with wear and/or age at a second point in time.

FIG. 7B is a diagram illustrating an embodiment of health metrics associated with wear and/or age at a second point in time. At time $t_1$ (shown here), the health metrics and/or temperatures of the unhealthier (in this example, older and/or more worn) group all reach threshold 708. (For simplicity and ease of explanation, all of the rotor modules are shown reaching this (e.g., critical) threshold at the same time. Naturally, any appropriate state or condition may be used to trigger the switch from a larger predefined amount of thrust to a lower predefined amount of thrust.) This corresponds to a more critical level or stage and it becomes much more important (e.g., compared to the previous state) to avoid worsening the health metrics of the unhealthier rotor modules. As such, a smaller predefined thrust value is used for those unhealthier rotor modules and/or the weights may be adjusted to give more weight to shifting thrust from unhealthier rotor modules to healthier rotor modules. As a result, the other rotors in the healthier group have to work harder. The following figure shows the health metrics at $t_2$.

Figure 7C:
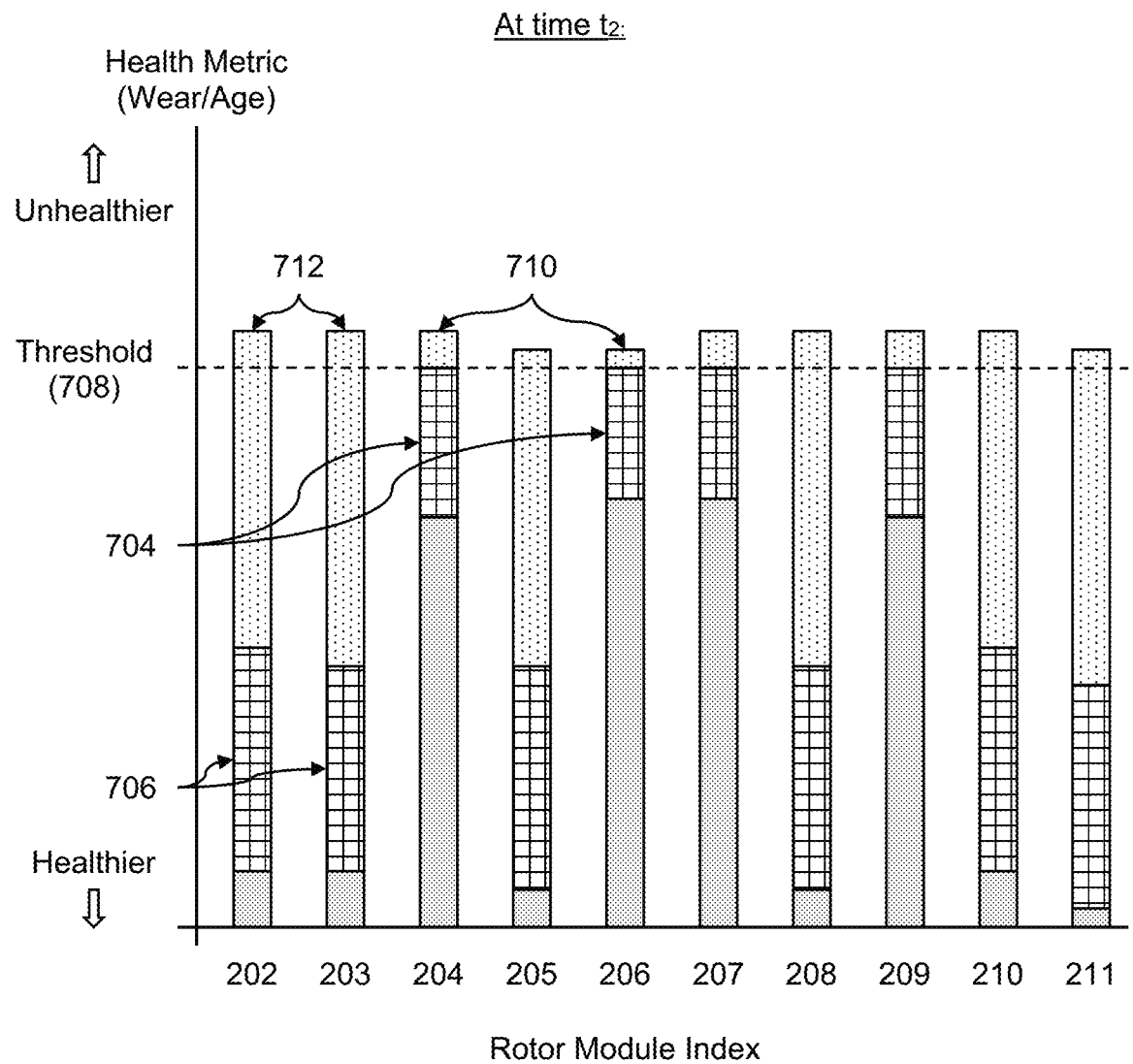
FIG. 7C is a diagram illustrating an embodiment of health metrics associated with wear and/or age at a third point in time.

FIG. 7C is a diagram illustrating an embodiment of health metrics associated with wear and/or age at a third point in time. At time $t_2$ (shown here), the additional health metrics and/or temperature added between time $t_1$ and $t_2$ for the unhealthier rotor modules (710) is less than the additional health metrics and/or temperature added between time $t_0$ and $t_1$ for that group (704). Conversely, the additional health metrics and/or temperature added between time $t_1$ and $t_2$ for the healthier rotor modules (712) is greater than the additional health metrics and/or temperature added between time $t_0$ and $t_1$ for that group (706). And in both, the additional health metrics and/or temperature added to the healthier group tends to be greater than the additional health metrics and/or temperature added to the unhealthier group.

For simplicity, this example describes two discrete stages or modes. Naturally, any weights or predefined values used may be continuously and/or gradually adjusted as the health metrics change. For example, as will be described in more detail below, weights may be tuned continuously and/or in real time to adjust the thrusts based on health metrics.

Although this example describes using age and/or wear for and/or as part of the health metrics, a variety of measurements, metrics, etc. (some of which are described above) may be used for and/or as part of a health metric.

The following figures describe the above examples more generally and/or formally in flowcharts.

Figure 8:
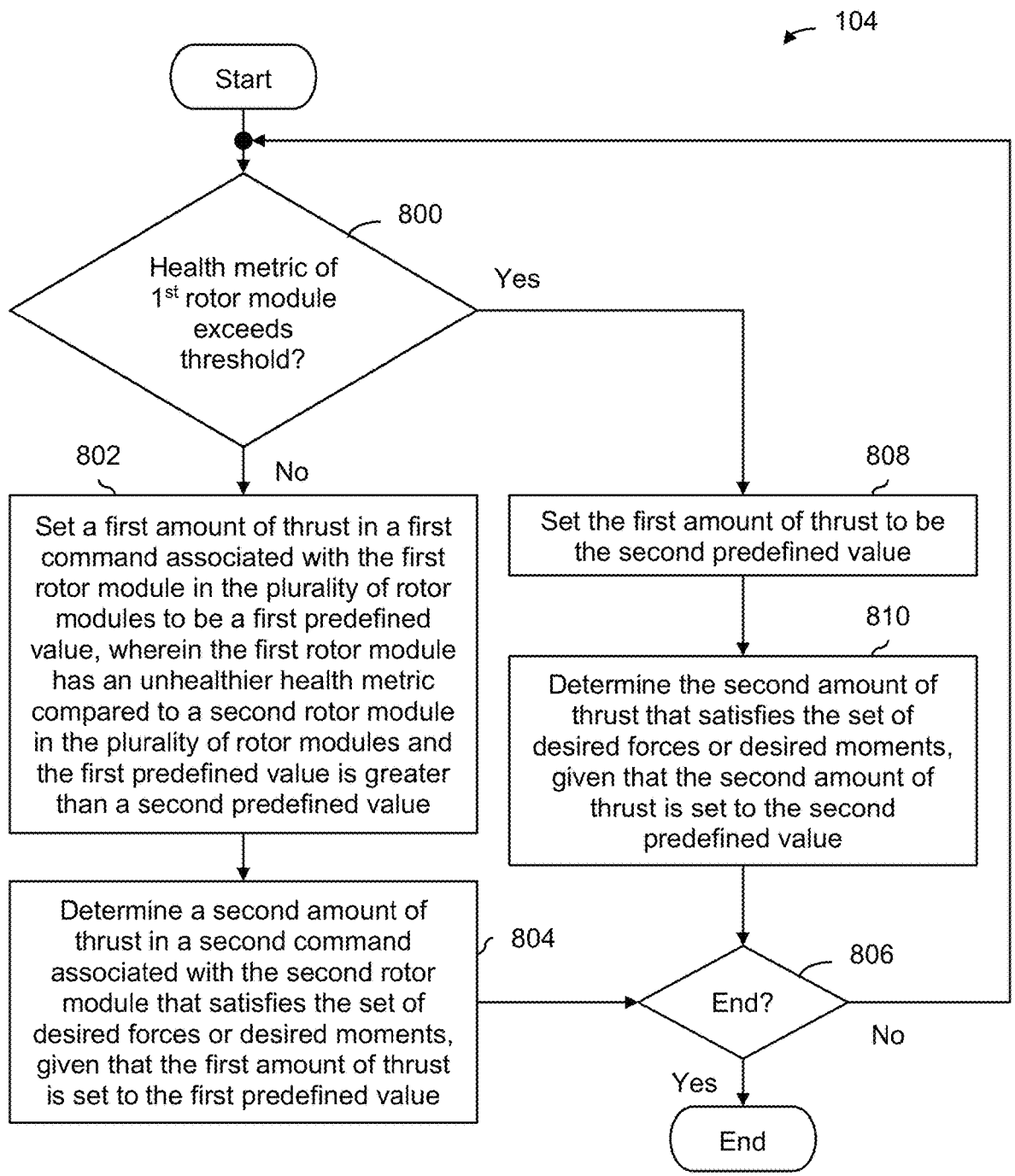
FIG. 8 is a flowchart illustrating an embodiment of a process to determine a plurality of commands, including by using different predefined amounts of thrust and a threshold.

FIG. 8 is a flowchart illustrating an embodiment of a process to determine a plurality of commands, including by using different predefined amounts of thrust and a threshold. In some embodiments, step 104 in FIG. 1 includes the example process shown here. In some embodiments, the process is performed by an allocation block. In some embodiments, the process is performed in real time and/or continuously.

At 800, it is determined whether a health metric associated with a first rotor module in the plurality of rotor modules exceeds a threshold. For example, this threshold may be used to differentiate between when it is critical to avoid further degradation of the health of that rotor module. See, for example, (e.g., critical) threshold 708 in FIG. 7.

If it is determined that the health metric does not exceed the threshold at 800, then a first amount of thrust in a first command associated with a first rotor module in the plurality of rotor modules is set to be a first predefined value, wherein the first rotor module has an unhealthier health metric compared to a second rotor module in the plurality of rotor modules and the first predefined value is greater than a second predefined value at 802. For example, in FIG. 7, rotor modules 1-5 (700) are being protected to some degree at the expense of rotor modules 6-10 (702). Additional health metrics and/or temperature added between time $t_0$ and $t_1$ (706a) is a result of using a larger initial predefined amount of thrust compared to later.

At 804, a second amount of thrust in a second command associated with the second rotor module is determined that satisfies the set of desired forces or desired moments, given that the first amount of thrust is set to the first predefined value. For example, thrusts for rotor modules 6-10 (702) would be determined which result in additional health metrics and/or temperature being added between time $t_0$ and $t_1$ (706b). In some embodiments (old) allocation block 304 in FIG. 3 is used to determine the second amount of thrust at step 804.

At 806, it is determined whether to end. For example, the process may end when the flight computer and/or aircraft shuts down. If it is determined at 806 to not end the process, a check of whether the health metric exceeds the threshold at step 800 is repeated.

Suppose at this time that the health metric does exceed the threshold at step 800. If so, the first amount of thrust is set to be the second predefined value at 808. For example, in FIG. 7, thrusts for rotor modules 1-5 (700) would be set to the now smaller predefined value, resulting in additional health metrics and/or temperature added between time $t_1$ and $t_2$ (706a).

At 810, the second amount of thrust that satisfies the set of desired forces or desired moments is determined, given that the second amount of thrust is set to the second predefined value. For example, in FIG. 7, these determined thrust(s) would result in additional health metrics and/or temperature added between time $t_1$ and $t_2$ (706b) for rotor modules 6-10 (702).

It is then checked (again) whether to end the process at step 806.

Figure 9:
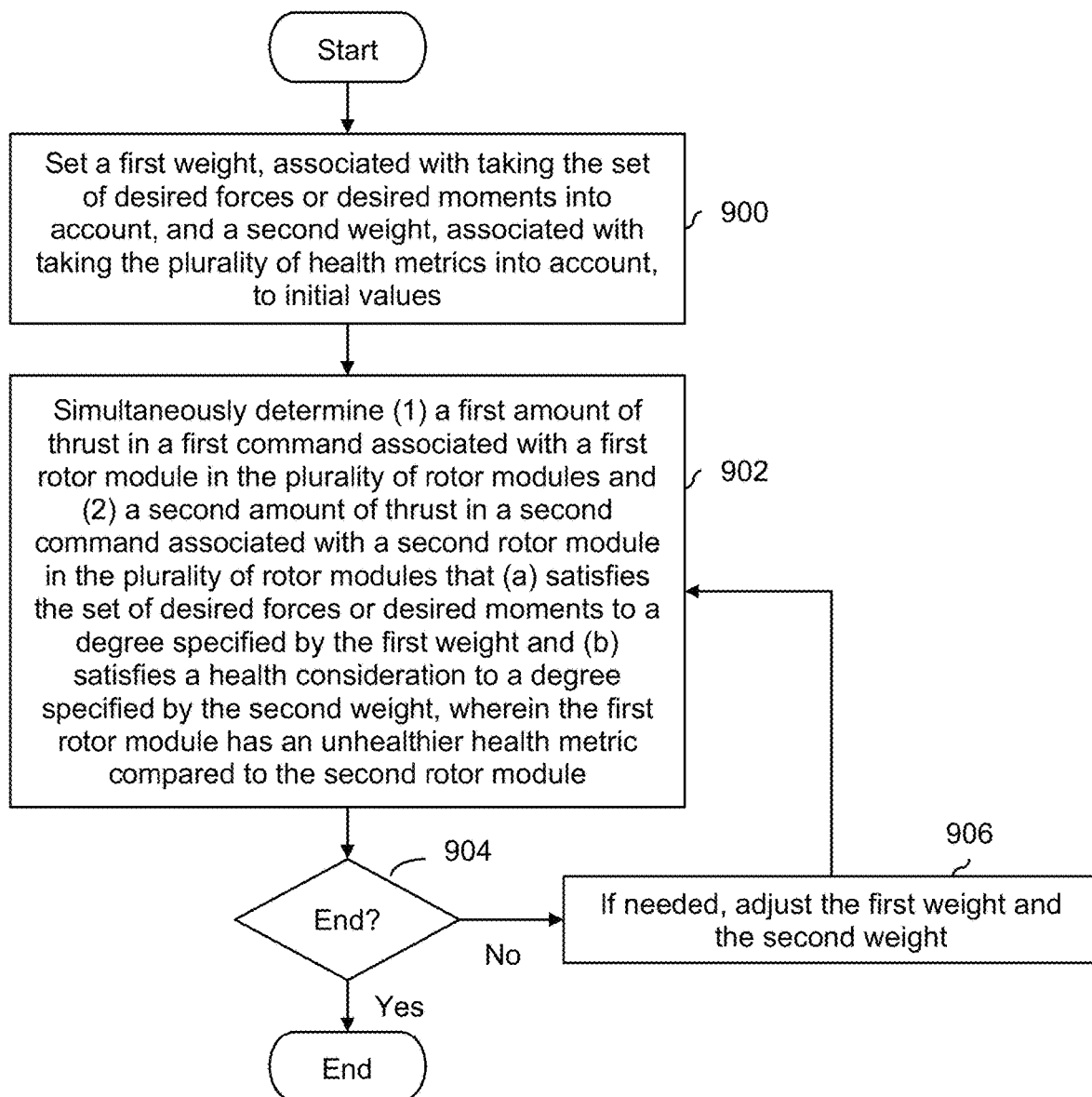
FIG. 9 is a flowchart illustrating an embodiment of a process to determine a plurality of commands, including by using different weights and a threshold.

FIG. 9 is a flowchart illustrating an embodiment of a process to determine a plurality of commands, including by using different weights and a threshold. In some embodiments, step 104 in FIG. 1 includes the example process shown here. In some embodiments, the process is performed by an allocation block. In some embodiments, the process is performed in real time and/or continuously.

At 900, a first weight, associated with taking the set of desired forces or desired moments into account, and a second weight, associated with taking the plurality of health metrics into account, are set to initial values.

At 902, (1) a first amount of thrust in a first command associated with a first rotor module in the plurality of rotor modules and (2) a second amount of thrust in a second command associated with a second rotor module in the plurality of rotor modules are simultaneously determined that (a) satisfies the set of desired forces or desired moments to a degree specified by the (e.g., initial value of the) first weight and (b) satisfies a health consideration to a degree specified by the (e.g., initial value of the) second weight, wherein the first rotor module has an unhealthier health metric compared to the second rotor module. For example, with the initial weights, additional health metrics and/or temperatures 700 and/or 702 may be generated.

At 904, it is determined whether to end. For example, this process may run so long as the flight computer and/or allocation block is on and only stops when the flight computer and/or allocation block shuts down (e.g., the aircraft lands). If so, the process ends.

Otherwise, if needed, the first weight and the second weight are adjusted at 906. For example, if the difference between the unhealthier rotor modules and healthier rotor modules grows, the weights may be so that the weight associated with satisfying the set of desired forces or desired moments decreases and the weight associated with satisfying a health consideration increases. This will more shifting from unhealthier rotor modules to healthier rotor modules, even at the expense of not satisfying the desired forces and/or moments to some degree. In another example, if all of the rotor modules are at a same level or degree of health and all remain at equal health levels, the weighting may stay the same.

At 904, the first and second amounts of thrust are simultaneously determined (e.g., using the most recent weights, updated at 906 if needed).

Returning briefly to FIG. 1, in some cases, it may not be possible to determine commands at step 104 which satisfy the desired forces and/or desired moments as well as the health-related considerations based on the health metrics. For example, they may be competing demands and no set of commands (e.g., thrusts) may satisfy both requirements. The following figures describe an example of how to determine commands (e.g., thrusts) if that occurs.

Figures 10A, 10B:
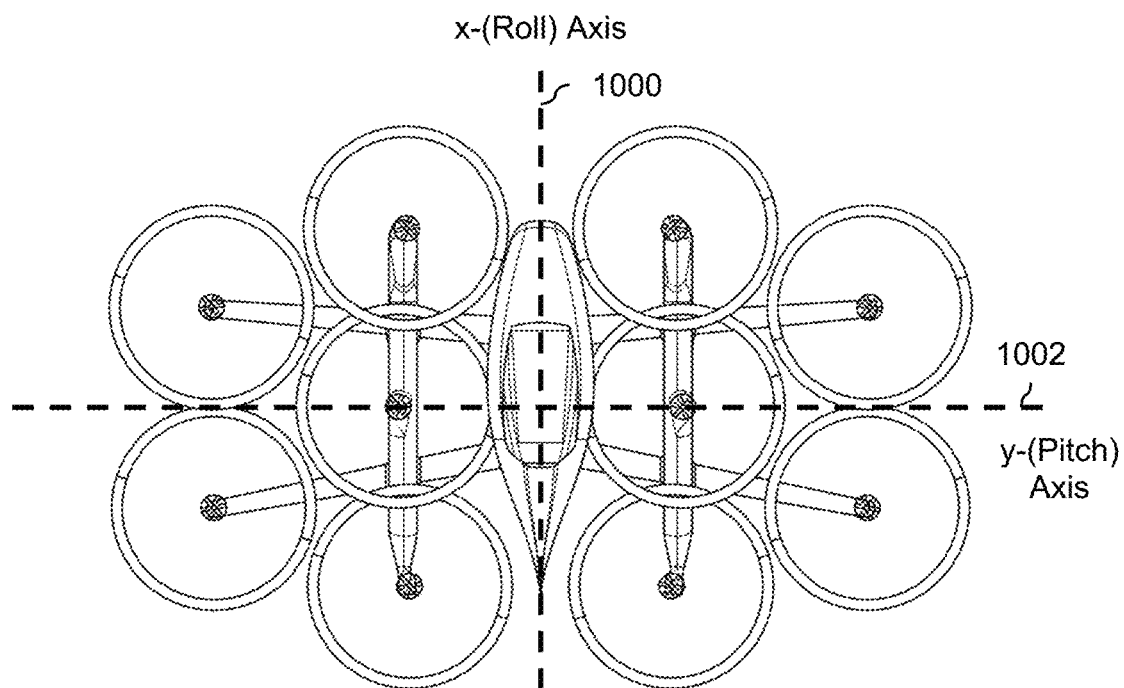
FIG. 10A is a diagram illustrating an embodiment of axes associated with a multicopter.
FIG. 10B is a diagram illustrating an embodiment of the relative importance for orthogonal components associated with desired forces and/or desired moments.

FIG. 10A is a diagram illustrating an embodiment of axes associated with a multicopter. In the example shown, the x-axis (1000), sometimes referred to as the roll axis, and the y-axis (1002), sometimes referred to as the pitch axis, are shown relative to the exemplary multicopter. A third axis, the z-axis (not shown) and sometimes referred to as a yaw axis, extends upwards out of the page from the center of the aircraft.

In this example, desired forces and/or desired moments are decomposed or otherwise broken up into three orthogonal components: a first component associated with movement along and/or rotation about the x-axis and y-axis (e.g., moving about within the x-y plane, tilting forwards/backwards, tilting left/right, etc.), a second component associated with movement along the z-axis (e.g., ascending or descending vertically), and a third component associated with rotating about the z-axis (e.g., when viewed from above, rotating in a clockwise or counterclockwise direction). The following figure describes the relative importance of these components.

FIG. 10B is a diagram illustrating an embodiment of the relative importance for orthogonal components associated with desired forces and/or desired moments. In this example, the first component (1050), associated with movement along and/or rotation about the x-axis and y-axis, is the most important component (e.g., which an allocation block should try to satisfy). For example, the most important thing the pilot may care about is getting from point A to desired point B. To do that, the aircraft needs to be able to control the first component fairly precisely. In particular, for the configuration shown in FIG. 10A where the rotors are connected to the multicopter at fixed positions, in order to maneuver properly (e.g., to some desired point), the multicopter must have control over the first component and it is therefore the most important component.

The second most important component in this example is movement along the z-axis (1052). For example, assuming the first component has been satisfied, the next most important consideration by the allocation block may be to ensure the aircraft does not ascend or descend unexpectedly or when not so instructed by the pilot. It may be unnerving for the pilot if the aircraft descends or ascends without being so instructed and also the pilot's desired destination may not be at the new altitude.

The third most important component (and therefore, the component which the allocation block can compromise on first) is the third component (1054), associated with rotation about the z-axis. For example, this type of rotation may still enable the aircraft to fly to a desired point B in the air (assuming the aircraft still has control over and/or is able to meet the first component and second component of the desired forces and/or desired moments).

In some embodiments, if an allocation block is unable to find commands which satisfy the desired forces and/or desired moments as well as the health-related considerations, the allocation block will attempt to find commands which compromise on one or more of the components of the desired forces and/or desired moments, beginning with the least important component (1054).

The following figure describes this more formally and/or generally in a flowchart.

Figure 11:
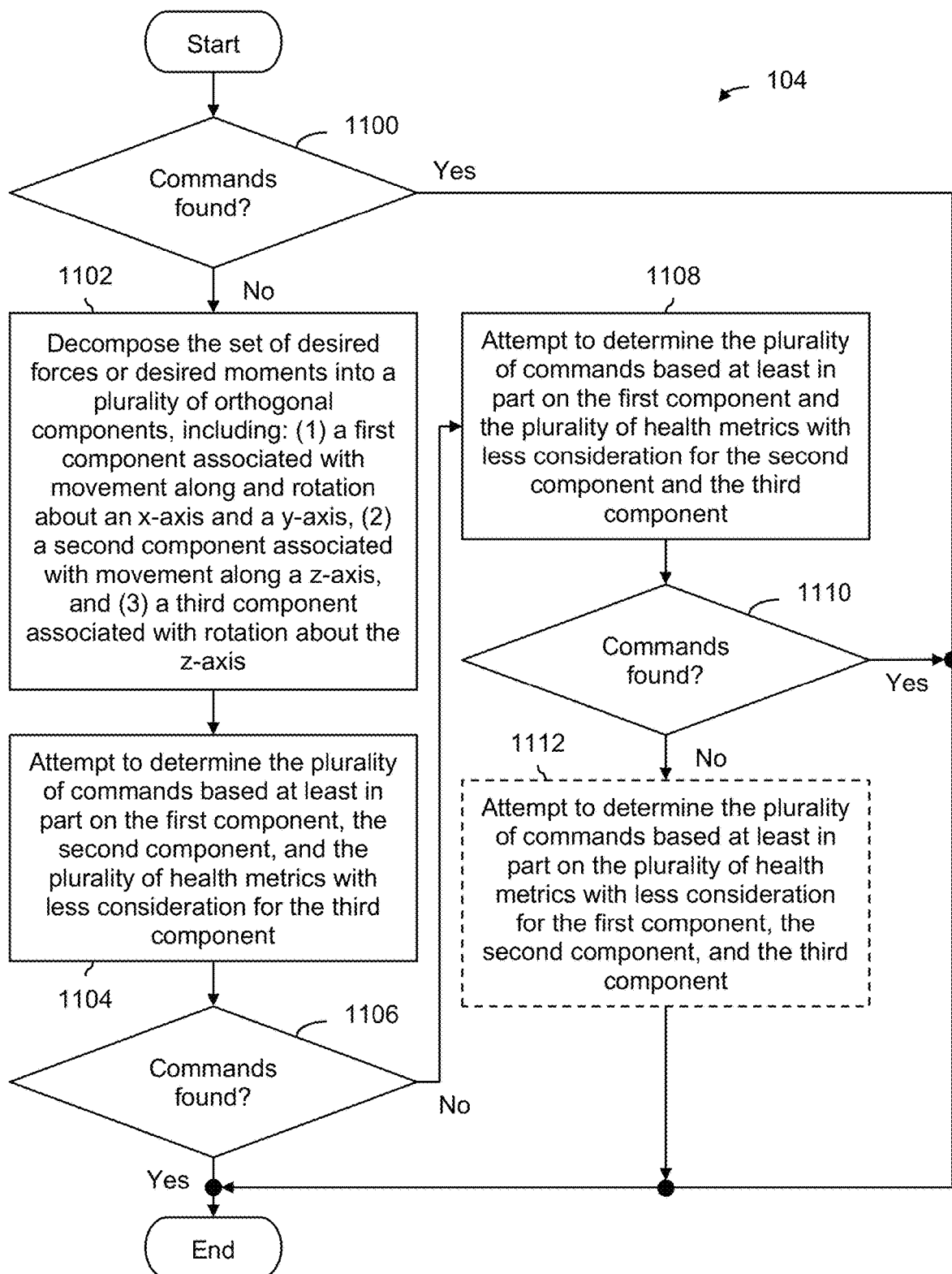
FIG. 11 is a flowchart illustrating an embodiment of a process to determine a plurality of commands, including by using different weights and a threshold.

FIG. 11 is a flowchart illustrating an embodiment of a process to determine a plurality of commands, including by using different weights and a threshold. In some embodiments, step 104 in FIG. 1 includes the example process shown here. In some embodiments, the process is performed by an allocation block.

At 1100, it is determined if the plurality of commands were able to be found (e.g., which completely satisfy the desired forces and/or desired moments, as well as the health-related considerations). If so, the process ends.

If not, at 1102, the set of desired forces or desired moments is decomposed into a plurality of orthogonal components, including: (1) a first component associated with movement along and rotation about an x-axis and a y-axis, (2) a second component associated with movement along a z-axis, and (3) a third component associated with rotation about the z-axis. See, for example, FIG. 10A for an example of the axes in question.

At 1104, an attempt to determine the plurality of commands based at least in part on the first component, the second component, and the plurality of health metrics is performed with less consideration for the third component. For example, commands which entirely satisfy the first component, the second component, and some health-related considerations but which only partially satisfy the third component would be acceptable at step 1104. To put it another way, commands which achieve the desired movement along and rotation about an x-axis and a y-axis, desired movement along a z-axis, and protect unhealthier rotor modules at the expense of healthier rotor modules by shifting thrust from the former to the latter, even at the expense of losing some control over rotation about the z-axis (e.g., compared to an ideal solution), are permitted to be found as solutions by the allocation block.

At 1106, it is determined if commands were able to be found (e.g., at 1104). If so, the process ends (e.g., and the commands determined at step 1104 are passed to the rotor modules).

If not, at 1108, an attempt to determine the plurality of commands based at least in part on the first component and the plurality of health metrics is performed with less consideration for the second component and the third component. In this scenario, a solution still could not be found easing up on the degree to which the third component is satisfied, so the allocation block is given some leeway with respect to both the second component (i.e., movement along the z-axis) as well as the third component (i.e., rotation about the z-axis).

At 1110, it is determined if commands were able to be found (e.g., at 1108). If so, the process ends (e.g., and the commands determined at 1108 are passed to the rotor modules). If not, at 1112, an attempt to determine the plurality of commands based at least in part on the plurality of health metrics is performed with less consideration for the first component, the second component, and the third component.

This last attempt at 1112 is shown for completeness but may be a bit drastic (e.g., it may be undesirable to downplay the importance of all three components at the same time since this may result in commands which do not attempt to satisfy the pilot's instructions at all or only to a very small degree). In some other embodiments, some other "last-ditch" attempts to find a set of commands for the plurality of rotor modules are used instead of step 1112.

For simplicity and ease of explanation, this example is presented as a three-stage process. In some embodiments, each of the orthogonal components has a weight associated with it and any of those component weights (and/or the health-related weight) may be gradually and/or continuously adjusted so there are more than three stages or attempts at finding commands that satisfy the current set of parameters or weights.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a communication interface that is configured to:
receive a set of one or more desired forces or desired moments associated with an aircraft that includes a plurality of rotor modules including a first rotor module and a second rotor module;
receive a plurality of health metrics, each of which is associated with a respective one of the plurality of rotor modules, including a first health metric that is associated with the first rotor module and a second health metric that is associated with the second rotor module; and
send a plurality of commands to the plurality of rotor modules, wherein each command in the plurality of commands is associated with a respective one of the plurality of rotor modules; and a processor that is coupled to the communication interface and that is configured to:
  determine the plurality of commands, including a first command associated with the first rotor module and a second command associated with the second rotor module, based at least in part on: (1) the set of desired forces or desired moments and (2) the plurality of health metrics, including by:
    determining a plurality of differences between the plurality of health metrics and a threshold, including by:
      determining a first difference between the first health metric and the threshold; and
      determining a second difference between the second health metric and the threshold; and
    determining the plurality of commands based at least in part on the plurality of differences, including by assigning a lower thrust value to the first command based at least in part on the first difference and a higher thrust value to the second command based at least in part on the second difference, wherein the first difference indicates a higher degree of wear on the first rotor module than the second difference indicates for the second rotor module; and
  after the plurality of rotor modules perform the plurality of commands, determine an updated plurality of health metrics.

2. The system recited in claim 1, wherein:
the communication interface and the processor are included in an allocation block in the aircraft; and
the first health metric is received from a first built-in health monitoring circuit in the first rotor module and the second health metric is received from a second built-in health monitoring circuit in the second rotor module.

3. The system recited in claim 1, wherein:
the system further includes an allocation block in the aircraft that includes the communication interface and the processor; and
the first health metric is received from a first built-in health monitoring circuit in the first rotor module and the second health metric is received from a second built-in health monitoring circuit in the second rotor module.

4. The system recited in claim 1, further including:
an allocation block in the aircraft that includes the communication interface and the processor; and
the plurality of rotor modules, wherein the first health metric is received from a first built-in health monitoring circuit in the first rotor module and the second health metric is received from a second built-in health monitoring circuit in the second rotor module.

5. The system recited in claim 1, wherein determining the plurality of commands further includes dividing, based at least in part on the plurality of health metrics, the plurality of commands into a first subset of commands for which there is at least some health metric consideration and a second subset of commands for which there is no health metric consideration.

6. The system recited in claim 1, wherein determining the plurality of commands further includes:
  dividing, based at least in part on the plurality of health metrics, the plurality of commands into a first subset of zero or more commands for which there is at least some health metric consideration and a second subset of zero or more commands for which there is no health metric consideration;
  determining values for the first subset of commands based at least in part on at least some of the plurality of health metrics; and
  after determining values for the first subset of commands, determining values for the second subset of commands, independent of the plurality of health metrics.

7. The system recited in claim 1, wherein determining the plurality of commands further includes:
  setting a first weight, associated with taking the set of desired forces or desired moments into account, and a second weight, associated with taking the plurality of health metrics into account, based at least in part on at least one of the plurality of health metrics; and
  using the first weight and the second weight to determine the plurality of commands.

8. The system recited in claim 1, wherein determining the plurality of commands further includes prioritizing control associated with a first axis over control associated with a second axis.

9. The system recited in claim 1, wherein determining the plurality of commands further includes prioritizing control associated with a first axis, including a roll axis, over control associated with a second axis, including a yaw axis.

10. The system recited in claim 1, wherein determining the plurality of commands further includes prioritizing control associated with a first axis, including a pitch axis, over control associated with a second axis, including a yaw axis.

11. A method, comprising:
  receiving a set of one or more desired forces or desired moments associated with an aircraft that includes a plurality of rotor modules including a first rotor module and a second rotor module;
  receiving a plurality of health metrics, each of which is associated with a respective one of the plurality of rotor modules, including a first health metric that is associated with the first rotor module and a second health metric that is associated with the second rotor module;
  determining a plurality of commands, including a first command associated with the first rotor module and a second command associated with the second rotor module, based at least in part on: (1) the set of desired forces or desired moments and (2) the plurality of health metrics, including by:
    determining a plurality of differences between the plurality of health metrics and a threshold, including by:
      determining a first difference between the first health metric and the threshold; and
      determining a second difference between the second health metric and the threshold; and
    determining the plurality of commands based at least in part on the plurality of differences, including by assigning a lower thrust value to the first command based at least in part on the first difference and a higher thrust value to the second command based at least in part on the second difference, wherein the first difference indicates a higher degree of wear on the first rotor module than the second difference indicates for the second rotor module;
  sending the plurality of commands to the plurality of rotor modules, wherein each command in the plurality of commands is associated with a respective one of the plurality of rotor modules; and after the plurality of rotor modules perform the plurality of commands, determining an updated plurality of health metrics.

12. The method recited in claim 11, wherein:
the method is performed by an allocation block in the aircraft; and
the first health metric is received from a first built-in health monitoring circuit in the first rotor module and the second health metric is received from a second built-in health monitoring circuit in the second rotor module.

13. The method recited in claim 11, wherein determining the plurality of commands further includes dividing, based at least in part on the plurality of health metrics, the plurality of commands into a first subset of commands for which there is at least some health metric consideration and a second subset of commands for which there is no health metric consideration.

14. The method recited in claim 11, wherein determining the plurality of commands further includes:
dividing, based at least in part on the plurality of health metrics, the plurality of commands into a first subset of zero or more commands for which there is at least some health metric consideration and a second subset of zero or more commands for which there is no health metric consideration;
determining values for the first subset of commands based at least in part on at least some of the plurality of health metrics; and
after determining values for the first subset of commands, determining values for the second subset of commands, independent of the plurality of health metrics.

15. The method recited in claim 11, wherein determining the plurality of commands further includes:
setting a first weight, associated with taking the set of desired forces or desired moments into account, and a second weight, associated with taking the plurality of health metrics into account, based at least in part on at least one of the plurality of health metrics; and
using the first weight and the second weight to determine the plurality of commands.

16. The method recited in claim 11, wherein determining the plurality of commands further includes prioritizing control associated with a first axis over control associated with a second axis.

17. The method recited in claim 11, wherein determining the plurality of commands further includes prioritizing control associated with a first axis, including a roll axis, over control associated with a second axis, including a yaw axis.

18. The method recited in claim 11, wherein determining the plurality of commands further includes prioritizing control associated with a first axis, including a pitch axis, over control associated with a second axis, including a yaw axis.

* * * * *